United States Patent
Yasue et al.

(10) Patent No.: US 7,124,259 B2
(45) Date of Patent: Oct. 17, 2006

(54) METHODS AND APPARATUS FOR INDEXED REGISTER ACCESS

(75) Inventors: Masahiro Yasue, Tokyo (JP); Tatsuya Iwamoto, Austin, TX (US)

(73) Assignee: Sony Computer Entertainment Inc., (JP)

( * ) Notice: Subject to any disclaimer, the term of this patent is extended or adjusted under 35 U.S.C. 154(b) by 402 days.

(21) Appl. No.: 10/838,051

(22) Filed: May 3, 2004

(65) Prior Publication Data
US 2005/0251659 A1 Nov. 10, 2005

(51) Int. Cl.
*G06F 12/02* (2006.01)
(52) U.S. Cl. .................................. 711/154
(58) Field of Classification Search ............ 711/154, 711/215
See application file for complete search history.

(56) References Cited

U.S. PATENT DOCUMENTS

| | | | |
|---|---|---|---|
| 5,446,859 A | | 8/1995 | Shin et al. |
| 5,832,533 A | * | 11/1998 | Agarwal et al. ............ 711/2 |
| 6,188,411 B1 | | 2/2001 | Lai |
| 6,446,190 B1 | * | 9/2002 | Barry et al. .............. 712/24 |
| 6,687,808 B1 | * | 2/2004 | Sugimoto ................ 712/209 |

* cited by examiner

*Primary Examiner*—Kevin L. Ellis
(74) *Attorney, Agent, or Firm*—Lerner, David, Littenberg, Krumholz & Mentlik, LLP

(57) ABSTRACT

Methods and apparatus enable the execution of processing sequences including the computation of a register index that is loaded into one of a plurality of registers, utilizing that index to identify another of the plurality of registers, and accessing data from or copying data to the indexed register to or from yet another register or a memory location.

63 Claims, 15 Drawing Sheets

METHODS AND APPARATUS FOR INDEXED REGISTER ACCESS

BACKGROUND OF THE INVENTION

The present invention relates to methods and apparatus for utilizing a plurality of registers in an indexed fashion such that data manipulation may be achieved using the registers as a local memory and such that data storage or loading from random access memory may be avoided.

Although the processing power of superscalar RISC processors is significant due, in part, to the fact that they use functional units (in which several instructions can be executed simultaneously), there are problems with this processing approach, for example, pipeline interlock. A pipeline interlock causes a delay in the fetching of successor instructions due to interruptions in the execution of preceding instructions.

There are two basic types of interlock delays in conventional RISC processors. The first kind of interlock delay is a data dependence delay that determines instruction latency. In this context, an instruction is not executed until all source data have been evaluated by prior instructions. The second kind of interlock delay is a reservation delay, which means that two instructions that are being executed may require a shared resources (e.g., data buses, internal registers, functional units, etc.) that are not always immediately available.

One of the conventional approaches to minimizing the impact of pipeline interlock delays is to utilize a fast random access memory (RAM), such as a hierarchical cache memory. Indeed, a level 1 (L1) cache memory may require only about 6 to 10 cycles to effect a storage or loading of data (when coupled to a processor running at a clock frequency on the order of a GHz). Reducing memory access latency generally has a positive effect on the overall processing speed, even when pipeline interlock delays exist.

There is, however, a limit on the efficacy of using hierarchical cache memories to offset the deleterious effects of pipeline interlock delays. Indeed, even hierarchical cache memories may exhibit latencies of about 6 to 10 clock cycles, where even lower latencies are desirable.

In order to avoid the latencies of RAM access, hierarchical cache access, or other data storage techniques, there has been a trend to utilize a large number of hardware registers as a stack for manipulating data. As hardware registers typically have latencies on the order of 1 clock cycle, they represent an attractive alternative to the use of RAM, cache, or other local memories that have higher latencies.

Although a substantial number of hardware registers may be employed as a surrogate memory for the manipulation of data, conventional instructions set architectures have not been optimized for intra-register data manipulation. For example, in order to move the data from one hardware register to another hardware register, some conventional instruction sets require that memory access take place, such as a memory store and a memory load. For example, the following operational code illustrates the dependency on RAM that conventional instruction sets have when effecting a transfer of data from one register, R1, to another register, R2.

STORE R1, address1; store R1's data in RAM at address1
LOAD address1, R2; load data from RAM address1 into R2

The substantial latencies associated with RAM, however, may offset any benefits from utilizing the hardware registers as a data stack. This problem is exacerbated when the software program being executed requires a significant number of table lookups and/or branch instructions.

It is noted that some existing instruction sets may permit access to a few registers as operands, which involves indexing to such registers. Unfortunately, any such access would have to be defined at the time that the software code was written. No real-time indexing by computing index values during program execution can be achieved using these existing instruction sets. Thus, reliance on memory access is still problematic in these systems. Other existing instruction sets might permit non-indexed register to register movement of data, but again the register definitions must be established at the time that the program is written and no run-time definitions can be performed.

Therefore, there are needs in the art for methods and apparatus that are capable of improving intra-register data processing such as moving data from one register to another, copying data from one register to another, etc. so that memory accesses may be significantly reduced and the associated latency may be avoided.

SUMMARY OF THE INVENTION

In accordance with one or more aspects of the present invention, a method includes the steps or actions of: performing computations to obtain a calculated value; loading the calculated value into at least one of a plurality of hardware registers of a processing system, each hardware register having an identifier number associated therewith; using the calculated value as an index to one of the identifier numbers and the hardware register associated therewith; and accessing data from the hardware register indexed by the calculated value. The method may also include copying the data into another one of the hardware registers.

Preferably, the step of copying the data into another one of the hardware registers occurs without requiring access into a random access memory of the processing system. By way of example, the steps may be used in a table look up procedure that does not require access into a random access memory of the processing system.

The method may further include accessing the calculated value from the at least one hardware register and using the calculated value as a pointer to the indexed hardware register.

The steps may be executed in response to a computer instruction defining a data move from a source hardware register to a destination hardware register. For example, the source hardware register may be the hardware register indexed by the calculated value, and the destination hardware register is the other hardware register. Further, the computer instruction may be characterized by the following operational code:

mov *Rm, Rp wherein Rm is a hardware register in which the calculated value is located, and Rp is the destination register.

In accordance with one or more further aspects of the present invention, a storage medium may contain at least one software instruction operable to cause a processor and a plurality of hardware registers, each hardware register having an identifier number associated therewith, to perform steps. The step may include performing computations to obtain a calculated value; loading the calculated value into at least one of a the plurality of hardware registers; using the calculated value as an index to one of the identifier numbers and the hardware register associated therewith; and accessing data from the hardware register indexed by the calculated value.

In accordance with one or more still further aspects of the present invention, a processing system may include a storage medium containing at least one software instruction operable to cause a processor and a plurality of hardware registers of the processing system, each hardware register having an identifier number associated therewith, to perform steps. The steps may include: performing computations to obtain a calculated value; loading the calculated value into at least one of a the plurality of hardware registers; using the calculated value as an index to one of the identifier numbers and the hardware register associated therewith; and accessing data from the hardware register indexed by the calculated value. The steps may also include copying the data into another one of the hardware registers.

In accordance with one or more still further aspects of the present invention, a method may include: performing computations to obtain a calculated value; loading the calculated value into at least one of a plurality of hardware registers of a processing system, each hardware register having an identifier number associated therewith; using the calculated value as an index to one of the identifier numbers and the hardware register associated therewith; and accessing data from another one of the hardware registers. The method may also include copying the data into the hardware register indexed by the calculated value.

In accordance with one or more still further aspects of the present invention, a storage medium may contain at least one software instruction operable to cause a processor and a plurality of hardware registers, each hardware register having an identifier number associated therewith, to perform steps. The steps may include: performing computations to obtain a calculated value; loading the calculated value into at least one of the plurality of hardware registers; using the calculated value as an index to one of the identifier numbers and the hardware register associated therewith; and accessing data from another one of the hardware registers. The steps may also include copying the data into the hardware register indexed by the calculated value.

In accordance with one or more still further aspects of the present invention, a processing system includes a storage medium containing at least one software instruction operable to cause a processor and a plurality of hardware registers of the processing system, each hardware register having an identifier number associated therewith, to perform steps. The steps may include: performing computations to obtain a calculated value; loading the calculated value into at least one of the plurality of hardware registers; using the calculated value as an index to one of the identifier numbers and the hardware register associated therewith; and accessing data from another one of the hardware registers. The steps may also include copying the data into the hardware register indexed by the calculated value.

In accordance with one or more still further aspects of the present invention, a method includes: performing computations to obtain a calculated value; loading the calculated value into at least one of a plurality of hardware registers of a processing system, each hardware register having an identifier number associated therewith; using the calculated value as an index to one of the identifier numbers and the hardware register associated therewith; and at least one of (i) storing data into a random access memory (RAM) coupled to the processor by accessing data from the hardware register indexed by the calculated value and copying the data into the RAM at a specified address; and (ii) loading data from the RAM by accessing data from the RAM at a specified address and copying the data into the hardware register indexed by the calculated value.

In accordance with one or more still further aspects of the present invention, a storage medium contains at least one software instruction operable to cause a processor and a plurality of hardware registers, each hardware register having an identifier number associated therewith, to perform steps. The steps may include: performing computations to obtain a calculated value; loading the calculated value into at least one of the hardware registers; using the calculated value as an index to one of the identifier numbers and the hardware register associated therewith; and at least one of (i) storing data into a random access memory (RAM) coupled to the processor by accessing data from the hardware register indexed by the calculated value and copying the data into the RAM at a specified address; and (ii) loading data from the RAM by accessing data from the RAM at a specified address and copying the data into the hardware register indexed by the calculated value.

In accordance with one or more still further aspects of the present invention, a processing system includes a storage medium containing at least one software instruction operable to cause a processor and a plurality of hardware registers of the processing system, each hardware register having an identifier number associated therewith, to perform steps. The steps may include: performing computations to obtain a calculated value; loading the calculated value into at least one of the hardware registers; using the calculated value as an index to one of the identifier numbers and the hardware register associated therewith; and at least one of (i) storing data into a random access memory (RAM) coupled to the processor by accessing data from the hardware register indexed by the calculated value and copying the data into the RAM at a specified address; and (ii) loading data from the RAM by accessing data from the RAM at a specified address and copying the data into the hardware register indexed by the calculated value.

DESCRIPTION OF THE DRAWINGS

For the purposes of illustration, there are forms shown in the drawing that are presently preferred, it being understood, however, that the invention is not limited to the precise arrangements and instrumentalities shown.

DETAILED DESCRIPTION OF THE PREFERRED EMBODIMENTS

Figure 1:
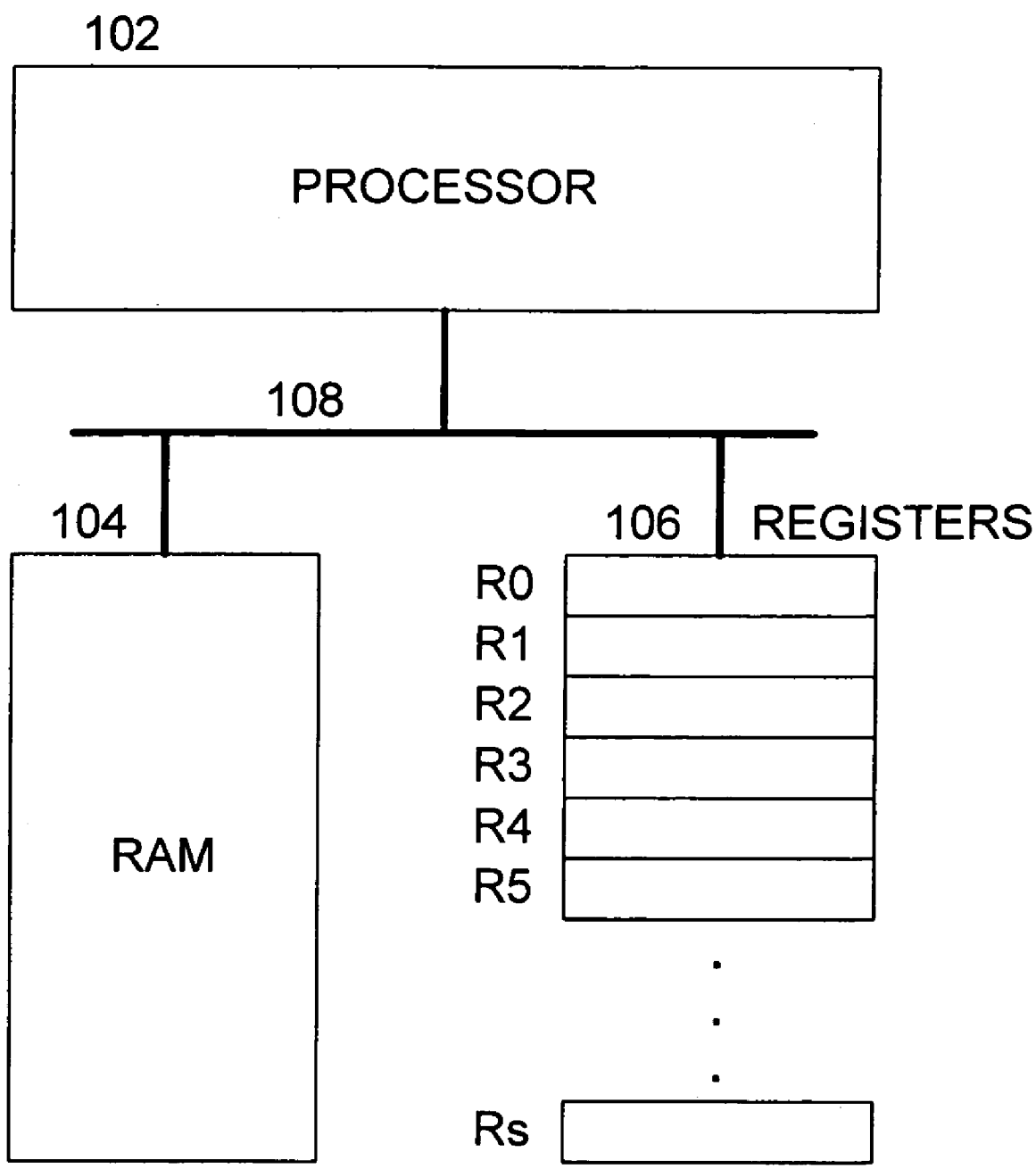
FIG. 1 is a block diagram of a processing system capable of carrying out intra-register transfers in accordance with one or more aspects of the present invention.

With reference to the drawings, wherein like numerals indicate like elements, there is shown in FIG. 1 a block diagram of a processing system 100 in accordance with one or more aspects of the present invention. The processing system 100 preferably includes a processor 102, a RAM 104, a plurality of registers 106 (individually labeled R0, R1, R2, . . . Rs). The processor 102, the RAM 104 and the registers 106 are operatively interconnected by way of a BUS 108. In a general sense, the processing system 100 is capable of moving and copying data among the registers 106 utilizing an indexing technique in which one or more of the registers 106 contain respective indices to one or more other registers 106.

In accordance with one or more aspects of the present invention, the processing system 100 is capable of operating utilizing a novel instruction set, which includes one or more computer instructions that are capable of accessing one or more of the registers 106 using the indices associated therewith. In particular, a value is computed during execution of the computer program containing the one or more instructions (i.e., during the run-time of the program). The calculated value is input into one of the registers 106. Thereafter, the value stored in one of the registers is used as an index to point to another of the registers 106 in which data are stored. The data are then accessed and used in accordance with further processing steps.

In accordance with further aspects of the invention, the run-time indexed register access may be applied to any number of instructions in which register access is contemplated and for which a benefit may be obtained. For example, move instructions, store instructions, load instructions, etc. may involve register accesses. The number of instructions and scenarios in which the indexed register access feature of the invention may be adopted are so vast that it would be impossible to list all of them. Thus, for the purposes of brevity and clarity, four examples of instructions that may employ the indexed register access aspects of the invention will be discussed in some detail: move instructions, store instructions and load instructions.

Turning first to a move instruction example, an instruction employing indexed register access may be characterized by the following operational code:

mov *Rm, Rp

The instruction mov represents the movement of data between one register 106 and another register 106, preferably without requiring access into the RAM 104. The operand *Rm is one of the hardware registers 106 in which an index to another of the registers 106 is located. The operand Rp is a destination register taken from among the hardware registers 106. The asterisk associated with the RM register is intended to show that indexed register access is contemplated. In an instruction set, however, the designation would preferably be made by way of definition in the instruction set bit field. An additional bit might be necessary to differentiate between conventional register access instructions (where indices are fixed in the instruction).

The basic operational sequences that are carried out when the processing system 100 executes the mov *Rm, Rp instruction include: (i) utilizing the value contained in hardware register Rm as an index into one of the other hardware registers 106, (ii) accessing the data from the hardware register 106 indexed by that value, and (iii) copying the data from the indexed hardware register 106 into the destination hardware register Rp.

Figure 2:
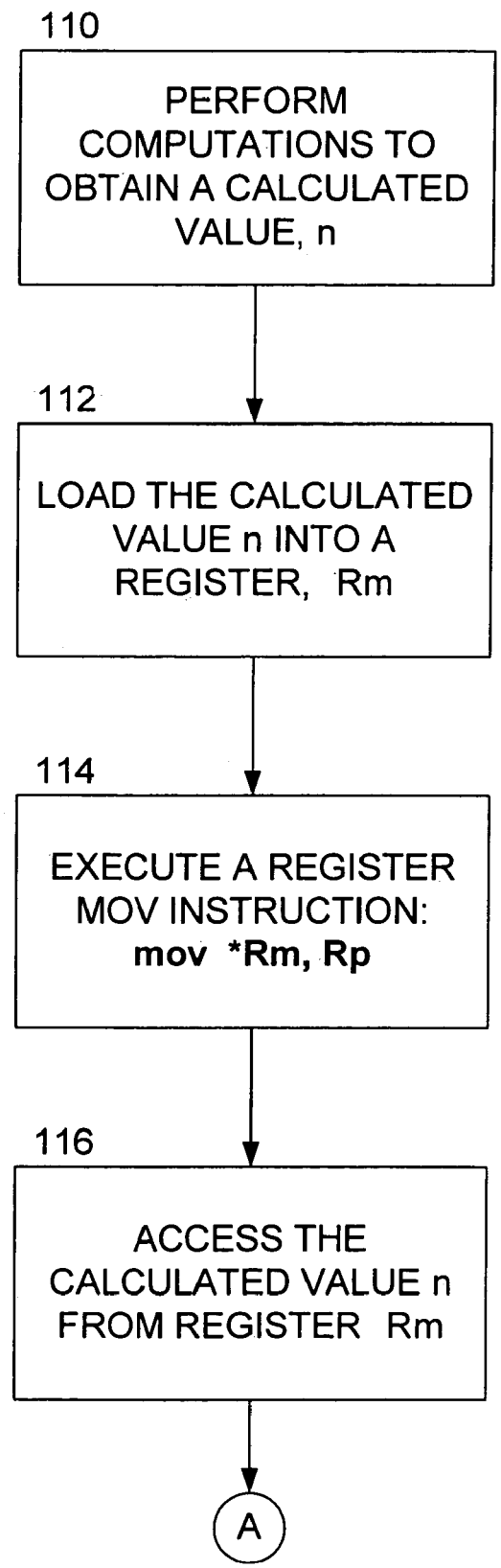
FIG. 2 is a flow diagram illustration process steps that may be carried out at least in part by a processing system such as that of FIG. 1 in accordance with one or more further aspects of the present invention.
Figure 3:
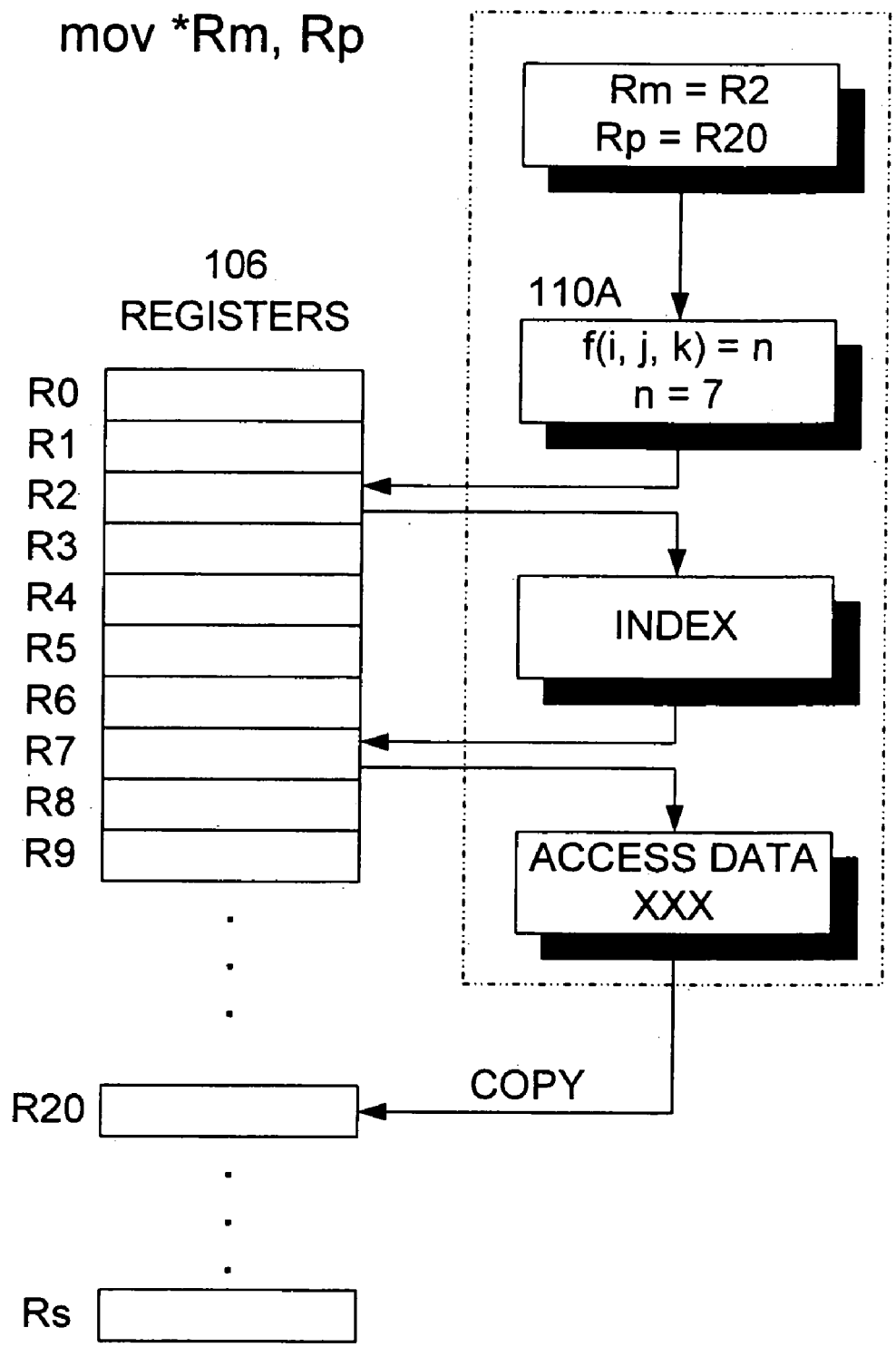
FIG. 3 is a partial block diagram and partial flow diagram providing further illustration of the process steps of FIG. 2 as well as additional process steps in accordance with one or more further aspects of the present invention
Figure 4:
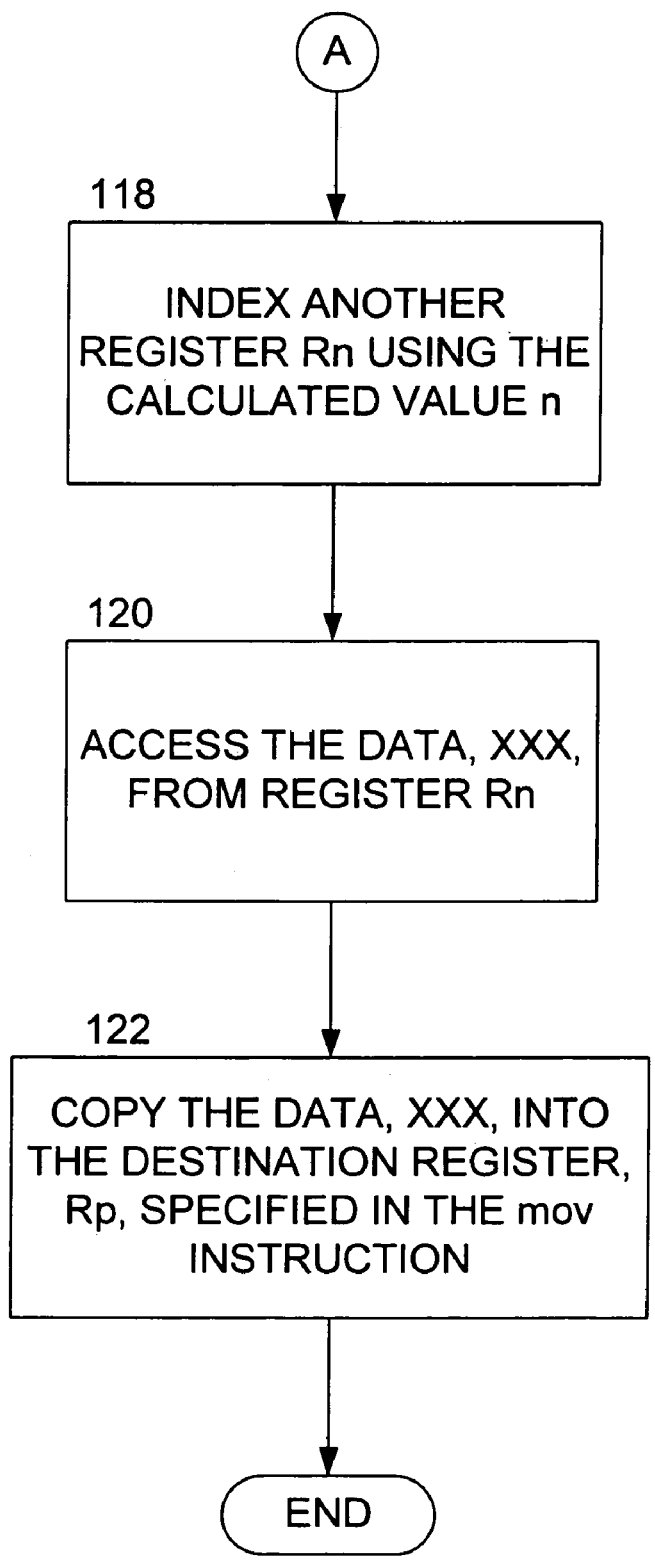
FIG. 4 is a flow diagram providing further illustration of some of the process steps of FIG. 3.

Further details concerning the sequence of events that are preferably carried out by the processing system 100 in order to achieve the result of the mov *Rm, Rp instruction will now be provided with reference to FIGS. 2–4. FIG. 2 is flow diagram illustrating some of the process steps that are preferably carried out in connection with the mov *Rm, Rp instruction. In particular, at action 110, the value of the index, n, is obtained. In accordance with the advantageous aspects of the present invention, the index value n may be obtained through one or more computations performed by the processor 102 in connection with an overall software program. In accordance with advantageous aspects of the present invention, this computation may take place during the run-time of the software program. Once the index value n is obtained, it is loaded into the register Rm (action 112). These actions, which may taken in conjunction with other actions, set up the registers 106 in a way that facilitates the execution of the mov *Rm, Rp instruction at action 114.

In order to more fully and completely describe the various aspects of the invention in connection with the mov *Rm, Rp instruction, further reference is made to FIG. 3, which is a partial block diagram and partial flow diagram of the process steps of FIG. 2, as well as further process steps of FIG. 4. FIG. 3 provides the details of indexed register to fixed register transfer (or movement) of data. In this example, it is assumed that register Rm is register R2 from among the plurality of registers 106, while the register Rp (the destination register) is register R20. It is noted that the selection and designations of these registers may be achieved utilizing any of the known register management techniques.

The box labeled 110A corresponds with action 110 of FIG. 2, where the value of the index n is obtained. In this example, the index value n is computed utilizing some arbitrary function, f(i, j, k)=n. In this example, the result of the functional computation is n=7. As discussed above with respect action 112 (FIG. 2), this calculated value n is loaded into the register Rm, which in this example is register R2.

After initiating the execution of the mov *Rm, Rp instruction (action 114), the value n within the register R2 is accessed (action 116, FIG. 2) and that value is used as an index to another register, Rn (action 118, FIG. 4). As shown in FIG. 3 as the value n is 7, the indexed register Rn is register R7 among the plurality of registers 106. Thereafter, the data contained within the indexed register R7 is accessed (action 120, FIG. 4) and is copied into the destination register Rp (action 122, FIG. 4). As shown in FIG. 3, in this example, the destination register Rp is register R20.

Thus, in accordance with this embodiment of the present invention, the data contained in register R7 was moved to register R20 by way of an indexed register access utilizing the index value contained in register R2. Advantageously, this sequence of events was carried out without requiring access to the RAM 104 and, therefore, the overall latency in carrying out the data transfer is significantly lower than contemplated heretofore.

Those skilled in the art will appreciate that the intra-register transfer of data achieved by the mov *Rm, Rp instruction may be readily applied to an overall table lookup procedure and/or an instruction branch routine that may be entirely carried out utilizing the registers 106 as opposed to requiring one or more accesses to the RAM 104.

In accordance with one or more further aspects of the present invention, the novel instruction set may alternatively or additionally include a computer instruction that may be characterized by the following operational code:

mov Rp, *Rm

This mov instruction represents the movement of data from a source register, Rp to a destination register 106, again preferably without requiring access into the RAM 104. The operand *Rm is one of the hardware registers 106 in which an index to the destination register 106 is located.

The basic operational sequences that are carried out when the processing system 100 executes the mov Rp, *Rm instruction include: (i) utilizing the value contained in hardware register Rm as an index into one of the other hardware registers 106, (ii) accessing the data from the source hardware register Rp, and (iii) copying the data from the source hardware register Rp into the hardware register 106 that was indexed.

Figure 5:
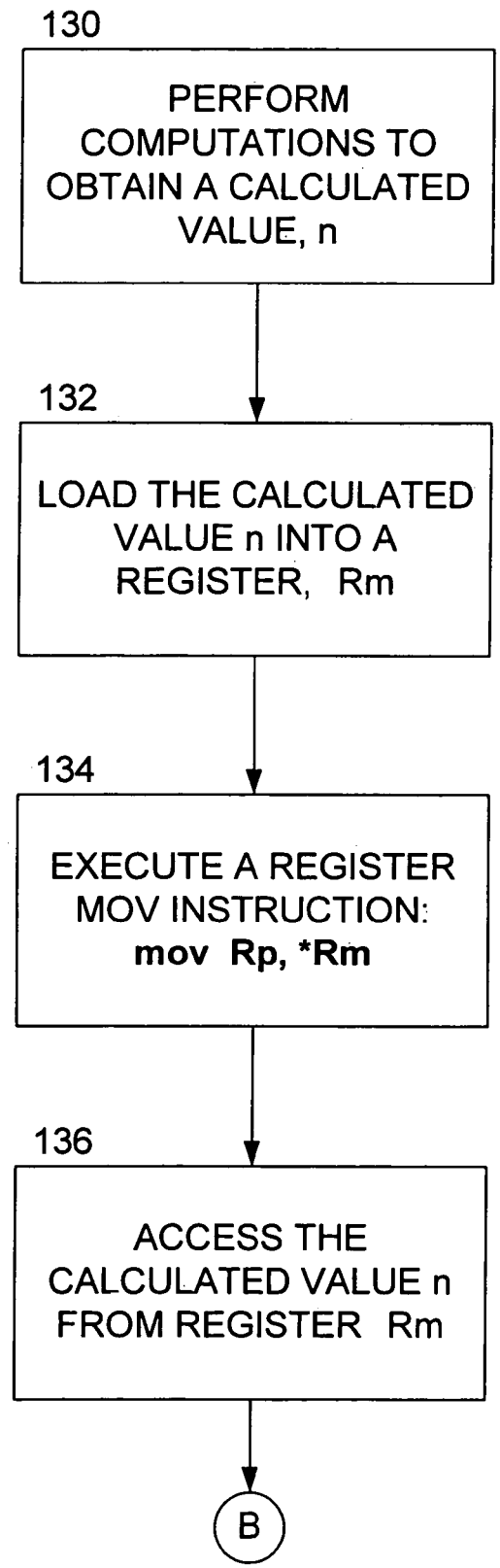
FIG. 5 is flow diagram illustrating process steps that may be carried out at least in part by a processing system such as that of FIG. 1 in accordance with one or more further aspects of the present invention.
Figure 6:
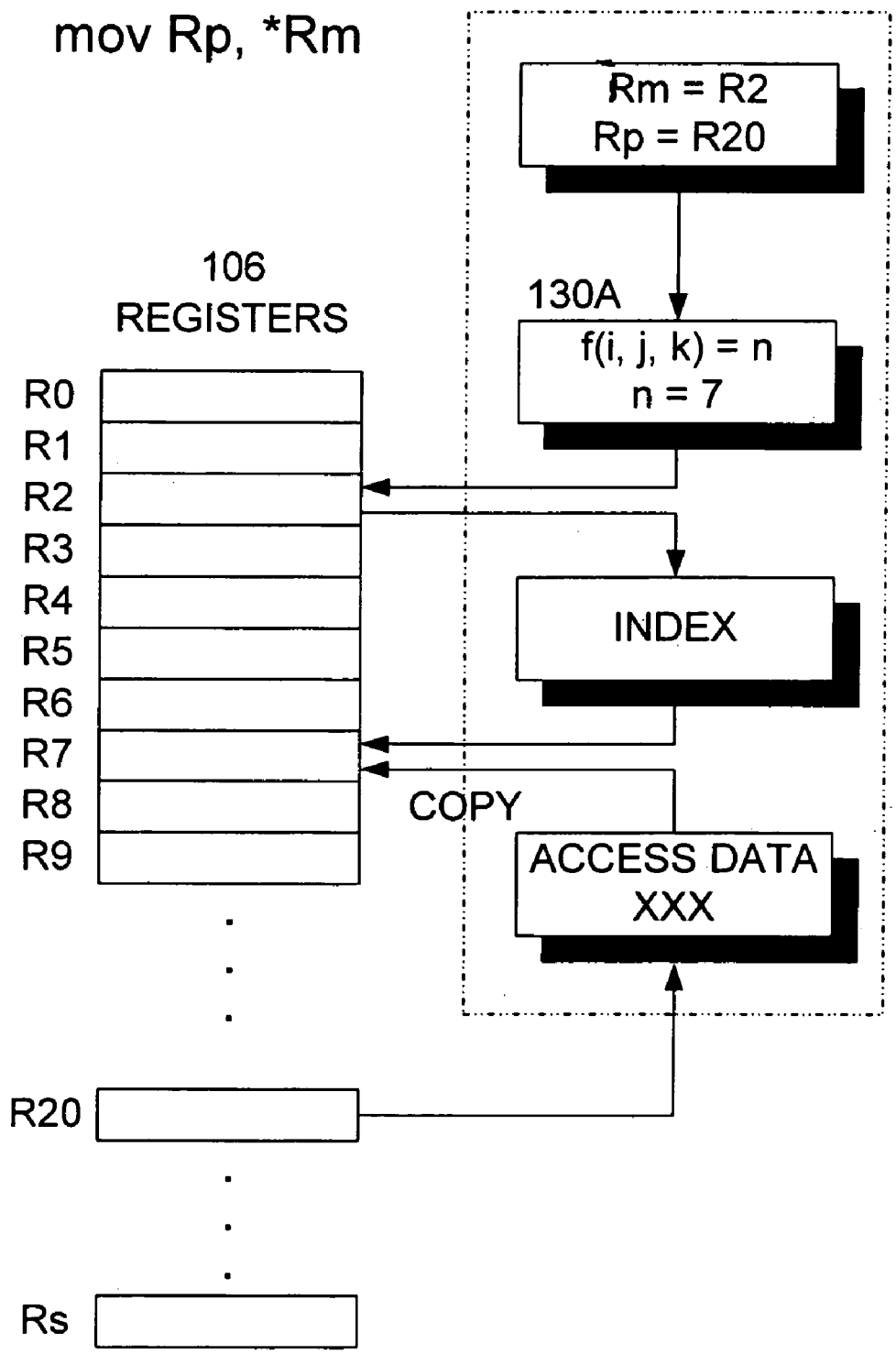
FIG. 6 is a partial block diagram and a partial flow diagram providing further illustration of the process steps of FIG. 5 as well as further process steps in accordance with further aspects of the present invention.
Figure 7:
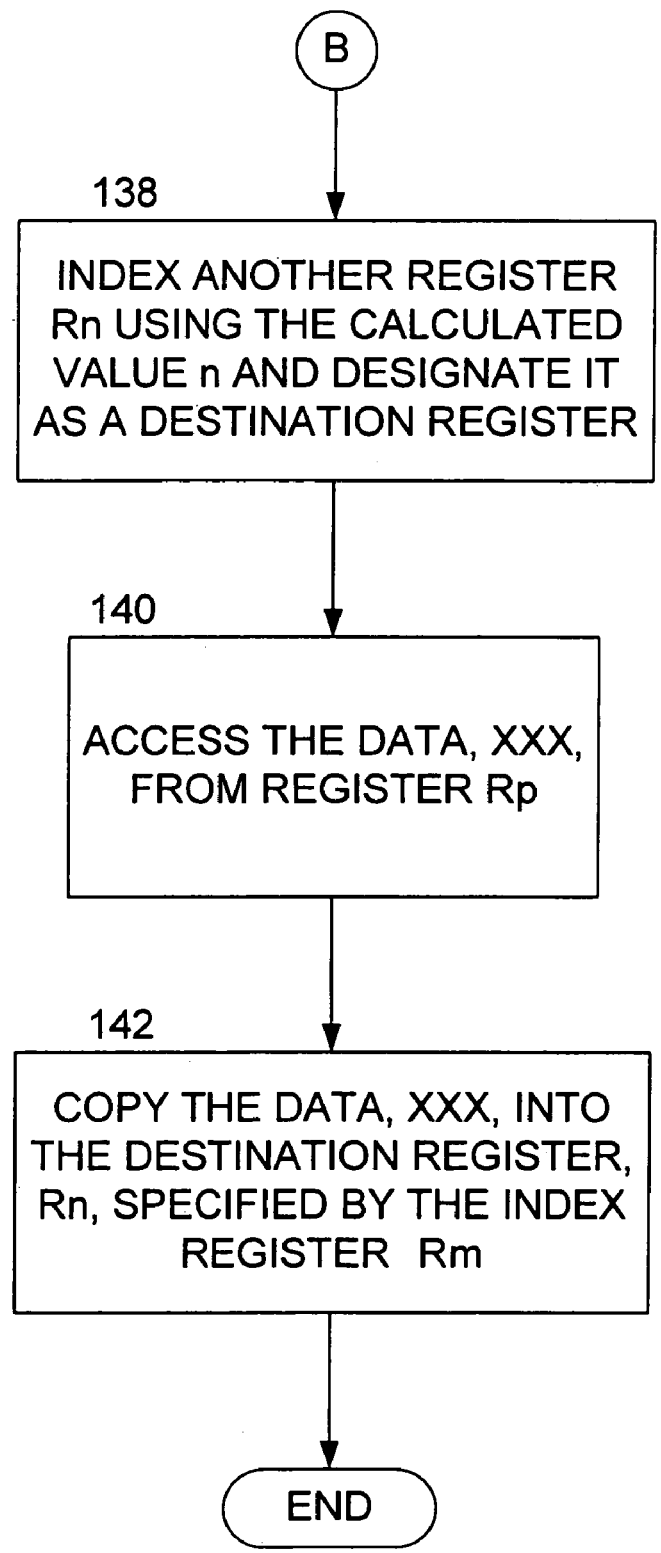
FIG. 7 is a flow diagram providing further illustration of some of the process steps of FIG. 6.

Further details concerning the sequence of events that are preferably carried out by the processing system 100 in order to achieve the result of the mov Rp, *Rm instruction will now be provided with reference to FIGS. 5–7. FIG. 5 is flow diagram illustrating some of the process steps that are preferably carried out in connection with the mov Rp, *Rm instruction. In particular, at action 130, the value of the index, n, is obtained. As with the prior embodiments of the invention, the index value n may be obtained through one or more computations performed by the processor 102 in connection with an overall software program. Once the index value n is obtained, it is loaded into the register Rm (action 132). This sets up the registers 106 in a way that facilitates the execution of the mov Rp, *Rm instruction at action 134.

In order to more fully and completely describe the various aspects of the invention in connection with the mov Rp, *Rm instruction, further reference is made to FIG. 6, which is a partial block diagram and partial flow diagram of the process steps of FIG. 5, as well as further process steps of FIG. 7. FIG. 6 provides the details of fixed register to indexed register transfer (or movement) of data. In this example, it is assumed that register Rm is register R2 from among the plurality of registers 106, while the register Rp (the source register) is register R20. The selection and designations of these registers may be achieved utilizing any of the known register management techniques.

The box labeled 130A corresponds with action 130 of FIG. 5, where the value of the index n is obtained. In this example, the index value n is computed utilizing the arbitrary function, f(i, j, k)=n, where, for consistency, the result of the computation is n=7. As discussed above with respect action 132 (FIG. 5), this calculated value n is loaded into the register Rm, which in this example is register R2.

After initiating the execution of the mov Rp, *Rm instruction (action 134), the value n within the register R2 is accessed (action 136, FIG. 5) and that value is used as an index to another register, Rn (action 138, FIG. 7). As shown in FIG. 6, the indexed register Rn is register R7. Thereafter, the data contained within the source register R20 is accessed (action 140, FIG. 7) and is copied into the destination register, which is the indexed register R7 (action 142, FIG. 7).

Thus, in accordance with this embodiment of the present invention, the data contained in a fixed register R20 was moved to register R7 by way of an indexed register access utilizing the index value contained in register R2. Advantageously, this sequence of events was carried out without requiring access to the RAM 104 and, therefore, the overall latency in carrying out the data transfer is significantly lower than contemplated heretofore.

As with prior aspects of the present invention, the intra-register transfer of data achieved by the mov Rp, *Rm instruction may be readily applied to an overall table lookup procedure and/or an instruction branch routine that may be entirely carried out utilizing the registers 106 as opposed to requiring one or more accesses to the RAM 104.

In accordance with another example of the present invention, the novel instruction set may include a computer instruction that may be characterized by the following operational code:

store *Rm, address1

This store instruction represents the storage of data from one register 106 to a location in the RAM 104. The operand *Rm contains an index to another of the registers 106 in which the data to be stored in RAM 104 is located.

The basic operational sequences that are carried out when the processing system 100 executes the store *Rm, address1 instruction include: (i) utilizing the value contained in hardware register Rm as an index into one of the other hardware registers 106, (ii) accessing the data from the hardware register 106 indexed by that value, and (iii) copying the data from the indexed hardware register 106 into a location in RAM 104 addressed by the values of address1.

Figure 8:
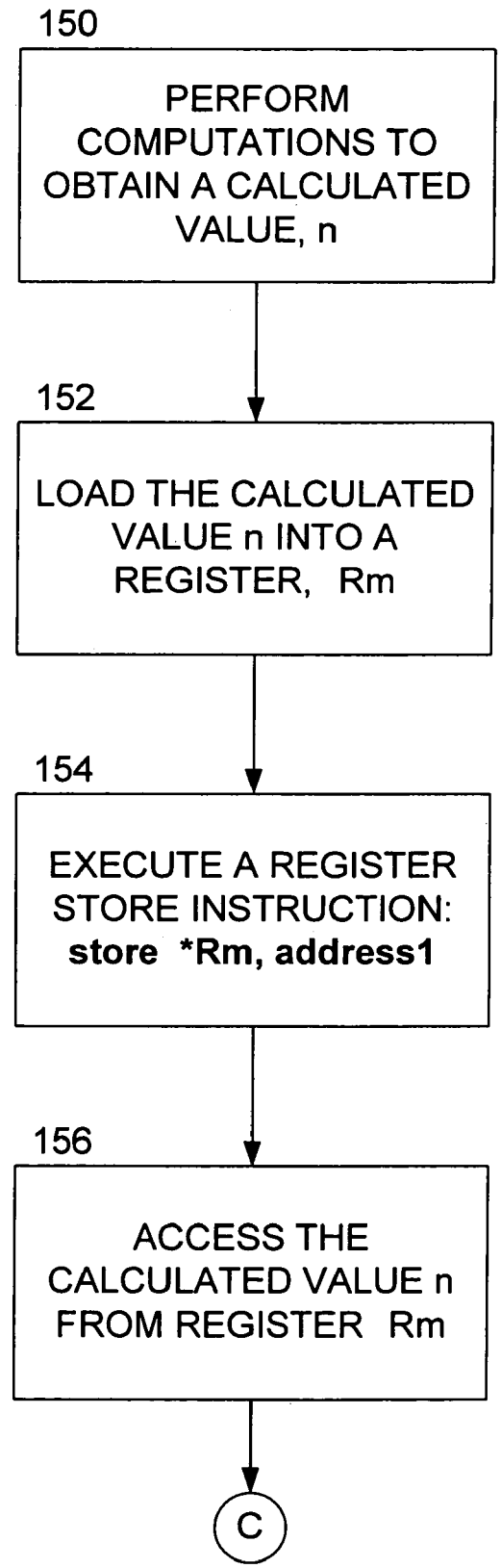
FIG. 8 is a flow diagram illustrating process steps that may be carried out at least in part by a processing system such as that of FIG. 1 in accordance with one or more aspects of the present invention.
Figure 9:
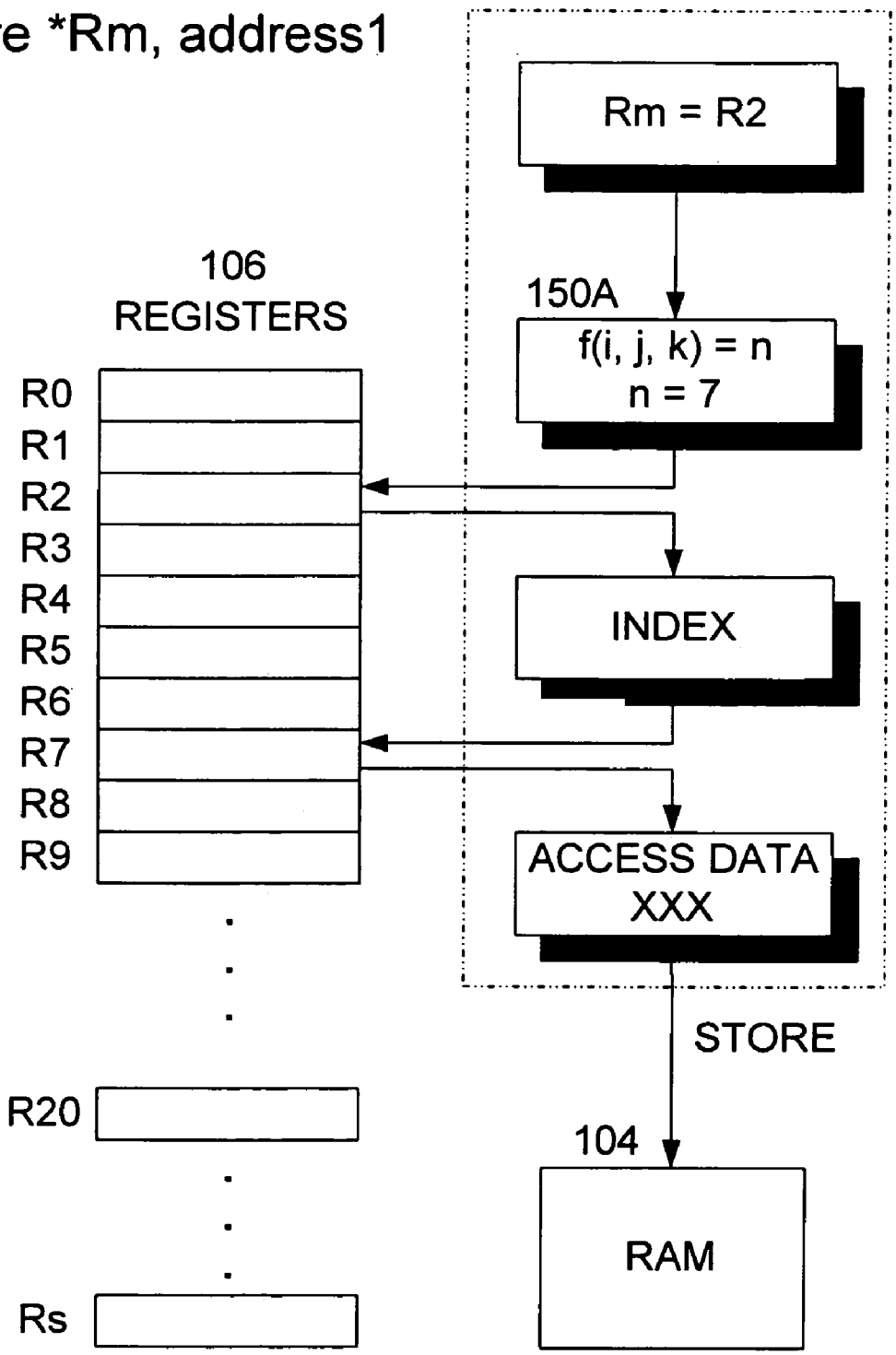
FIG. 9 is a partial block diagram and a partial flow diagram providing further illustration of the process steps of FIG. 8 as well as further process steps in accordance with further aspects of the present invention.
Figure 10:
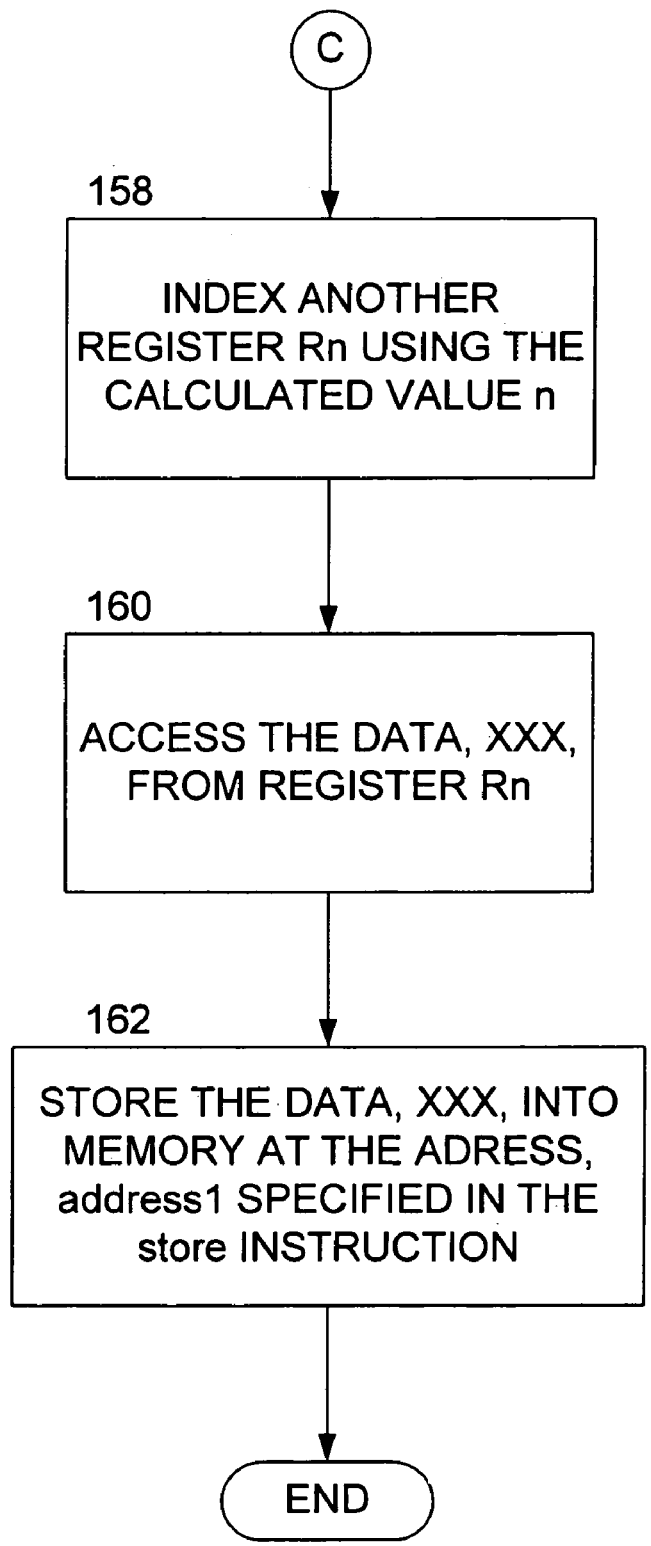
FIG. 10 is a flow diagram providing further illustration of the process steps of FIG. 9.

Further details concerning the sequence of events that are preferably carried out by the processing system 100 in order to achieve the result of the store *Rm, address1 instruction will now be provided with reference to FIGS. 8–10. FIG. 8 is flow diagram illustrating some of the process steps that are preferably carried out in connection with the store *Rm, address1 instruction. In particular, at action 150, the value of the index, n, is obtained. As with the other embodiments of the invention, the index value n may be obtained through one or more computations performed by the processor 102 in connection with an overall software program. Once the index value n is obtained, it is loaded into the register *Rm (action 152). These actions set up the registers 106 in a way that facilitates the execution of the store *Rm, address1 instruction at action 154.

In order to more fully and completely describe the various aspects of the invention in connection with the store *Rm, address1 instruction, further reference is made to FIG. 9, which is a partial block diagram and partial flow diagram of the process steps of FIG. 8, as well as further process steps of FIG. 10. FIG. 9 provides the details of indexed register to memory location storage of data. As with prior examples, it is assumed that register *Rm is register R2 from among the plurality of registers 106.

The box labeled 150A corresponds with action 150 of FIG. 8, where the value of the index n is obtained. In this example, the index value n is computed utilizing an arbitrary function, f(i, j, k)=n, where as in prior examples the result of the functional computation is n=7. As discussed above with respect action 152 (FIG. 8), this calculated value n is loaded into the register Rm, which as before is register R2.

After initiating the execution of the store *Rm, address1 instruction (action 154), the value n within the register R2 is accessed (action 156, FIG. 8) and that value is used as an index to another register, Rn (action 158, FIG. 10). As shown in FIG. 9, as the indexed register Rn is register R7 among the plurality of registers 106. Thereafter, the data contained within the indexed register R7 is accessed (action 160, FIG. 10) and is copied into the location in RAM 104 addressed by the value of address1 (action 162, FIG. 10). Thus, in accordance with this embodiment of the present invention, the data contained in register R7 was stored into the RAM 104 by way of an indexed register access utilizing the index value contained in register R2.

In accordance with one or more further examples of the present invention, the novel instruction set may alternatively or additionally include a computer instruction that may be characterized by the following operational code:

load address1, *Rm

This load instruction represents the movement of data from a location in RAM 104 addressed by address1 to a destination register 106 indexed by the value contained in the register *Rm.

The basic operational sequences that are carried out when the processing system 100 executes the load address1, *Rm instruction include: (i) utilizing the value contained in hardware register Rm as an index into one of the other hardware registers 106, (ii) accessing the data from the location in RAM 104 addressed by the value of address1, and (iii) copying the data from that location in the RAM 104 into the hardware register 106 that was indexed.

Figure 11:
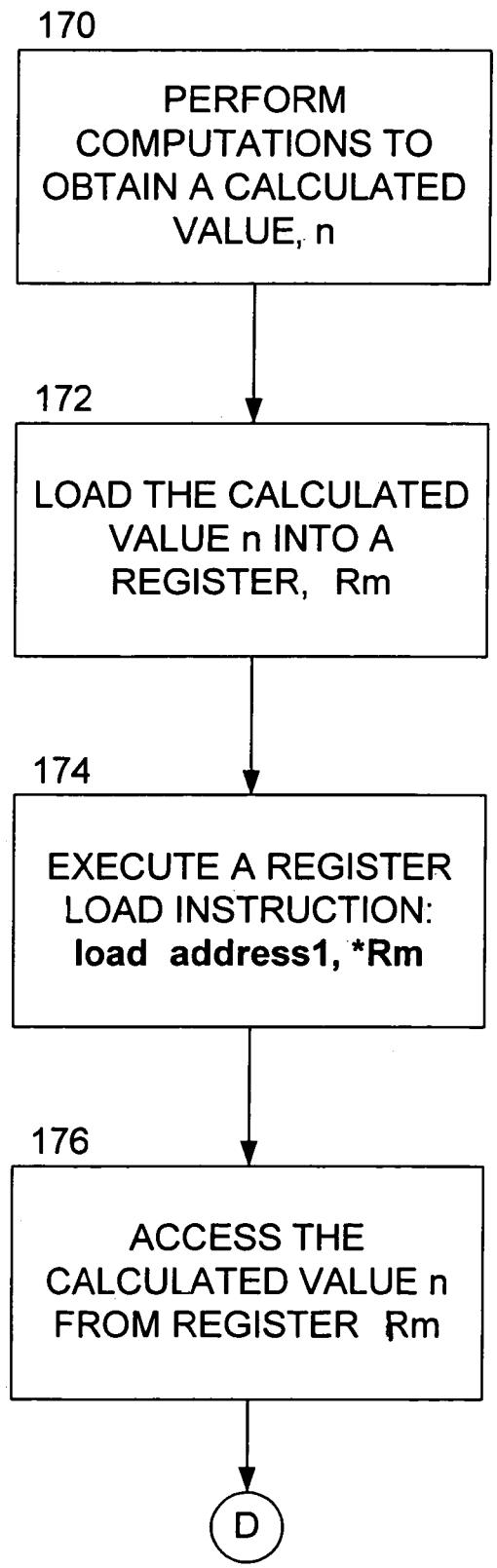
FIG. 11 is a flow diagram illustrating process steps that may be carried out at least in part by a processing system such as that illustrated in FIG. 1 in accordance with one or more aspects of the present invention.
Figure 12:
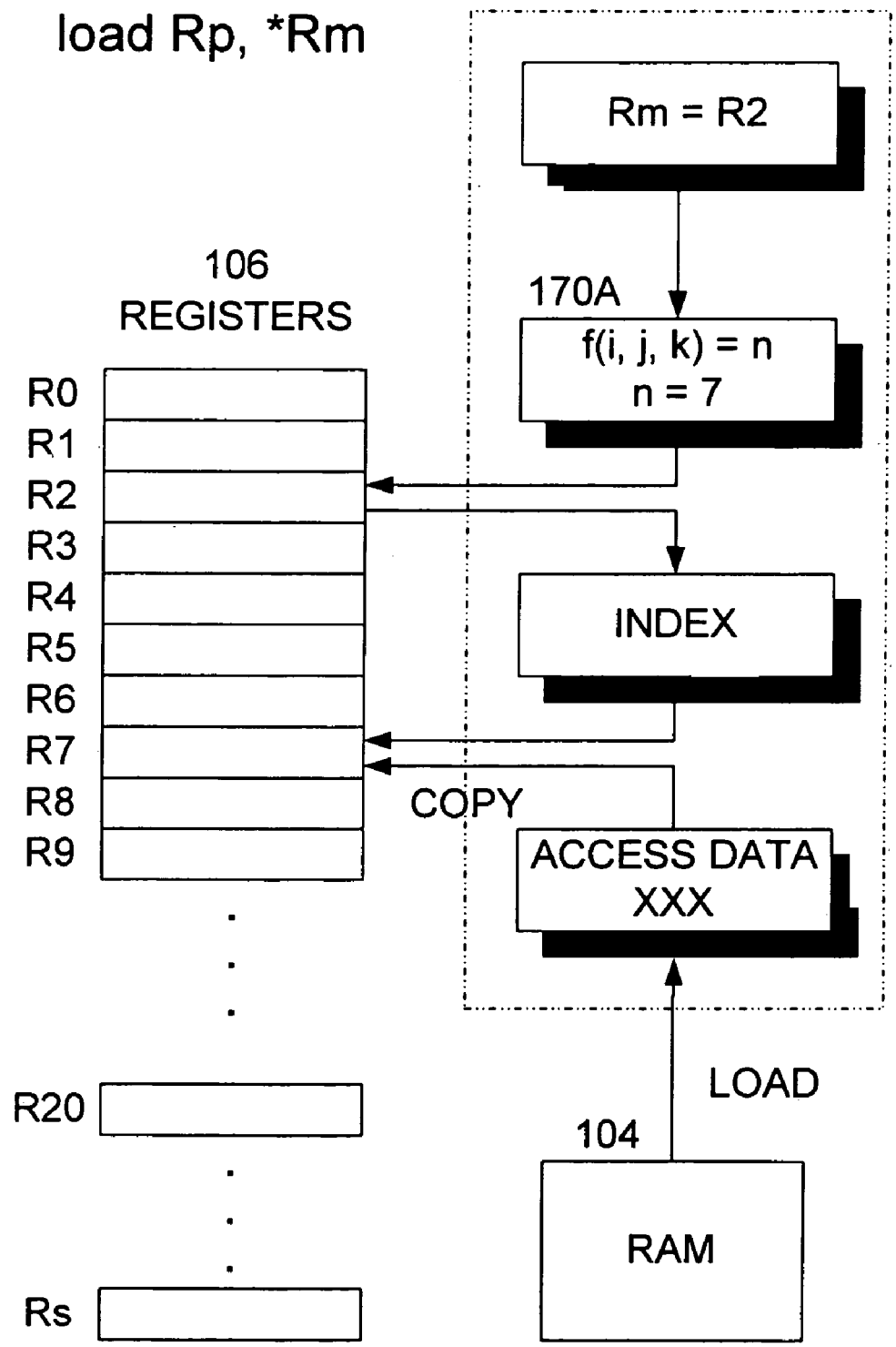
FIG. 12 is a partial block diagram and partial flow diagram providing further illustration of the process steps of FIG. 11 as well as further process steps in accordance with one or more further aspects of the present invention.
Figure 13:
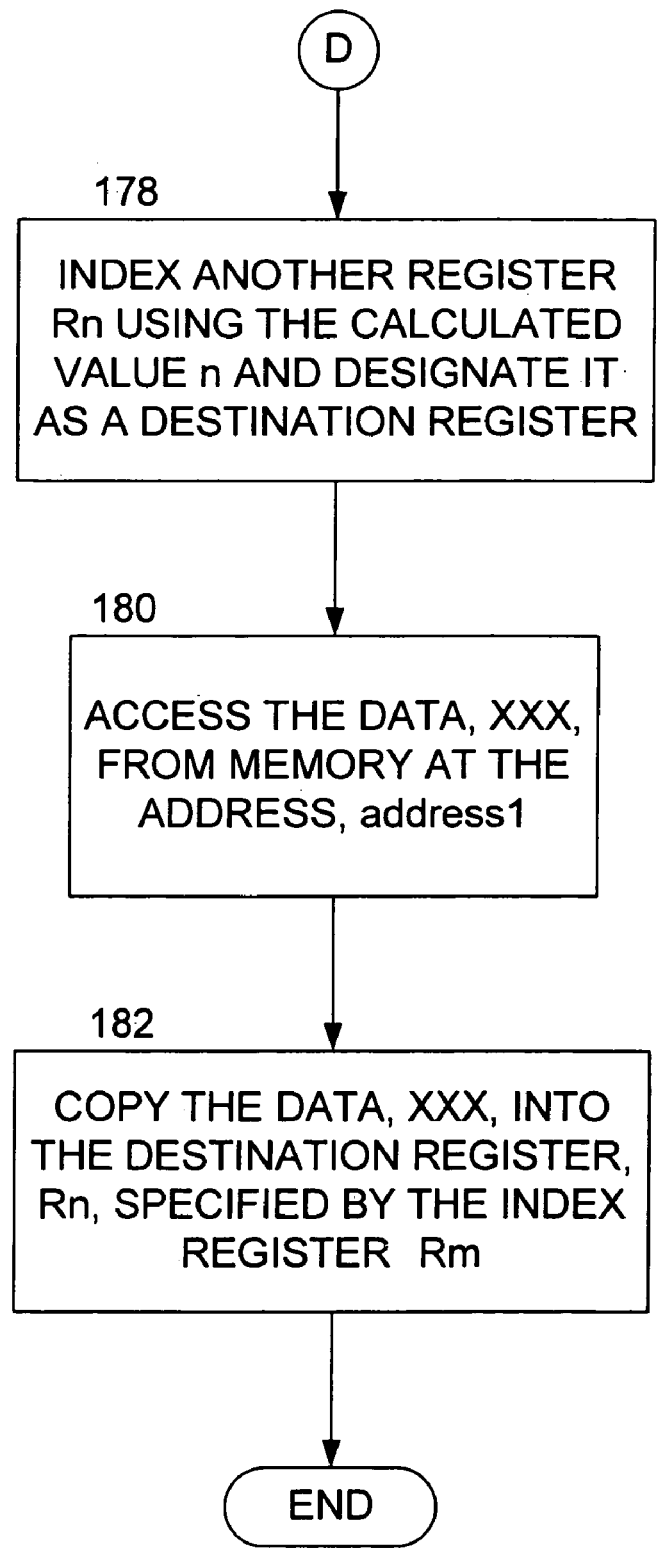
FIG. 13 is a flow diagram providing further illustration of the process steps of FIG. 12.

Further details concerning the sequence of events that are preferably carried out by the processing system 100 in order to achieve the result of the load address1, *Rm instruction will now be provided with reference to FIGS. 11–13. FIG. 11 is flow diagram illustrating some of the process steps that are preferably carried out in connection with the load address1, *Rm instruction. In particular, at action 170, the value of the index, n, is obtained. As with the prior embodiments of the invention, the index value n may be obtained through one or more computations performed by the processor 102 in connection with an overall software program. Once the index value n is obtained, it is loaded into the register Rm (action 172). This sets up the registers 106 in a way that facilitates the execution of the load address1, *Rm instruction at action 174.

In order to more fully and completely describe the various aspects of the invention in connection with the load address1, *Rm instruction, further reference is made to FIG. 12, which is a partial block diagram and partial flow diagram of the process steps of FIG. 11, as well as further process steps of FIG. 13. FIG. 12 provides the details of a memory location to indexed register transfer of data. As with other examples, it is assumed that register Rm is register R2.

The box labeled 170A corresponds with action 170 of FIG. 11, where the value of the index n is obtained. The index value n is computed utilizing the arbitrary function, f(i, j, k)=n, where, for consistency, the result of the computation is n=7. As discussed above with respect action 172 (FIG. 11), this calculated value n is loaded into the register R2.

After initiating the execution of the load address1, *Rm instruction (action 174), the value n within the register P2 is accessed (action 176, FIG. 11) and that value is used as an index to another register, Rn (action 178, FIG. 13), which is register R7. Thereafter, the data contained within the RAM 104 at the location addressed by address1 is accessed (action 180, FIG. 13) and is copied into the destination register, which is the indexed register R7 (action 182, FIG. 13). Thus, in accordance with this embodiment of the present invention, the data contained in a memory location of the RAM 104 is loaded into register R7 by way of an indexed register access utilizing the index value contained in register R2.

Figure 14:
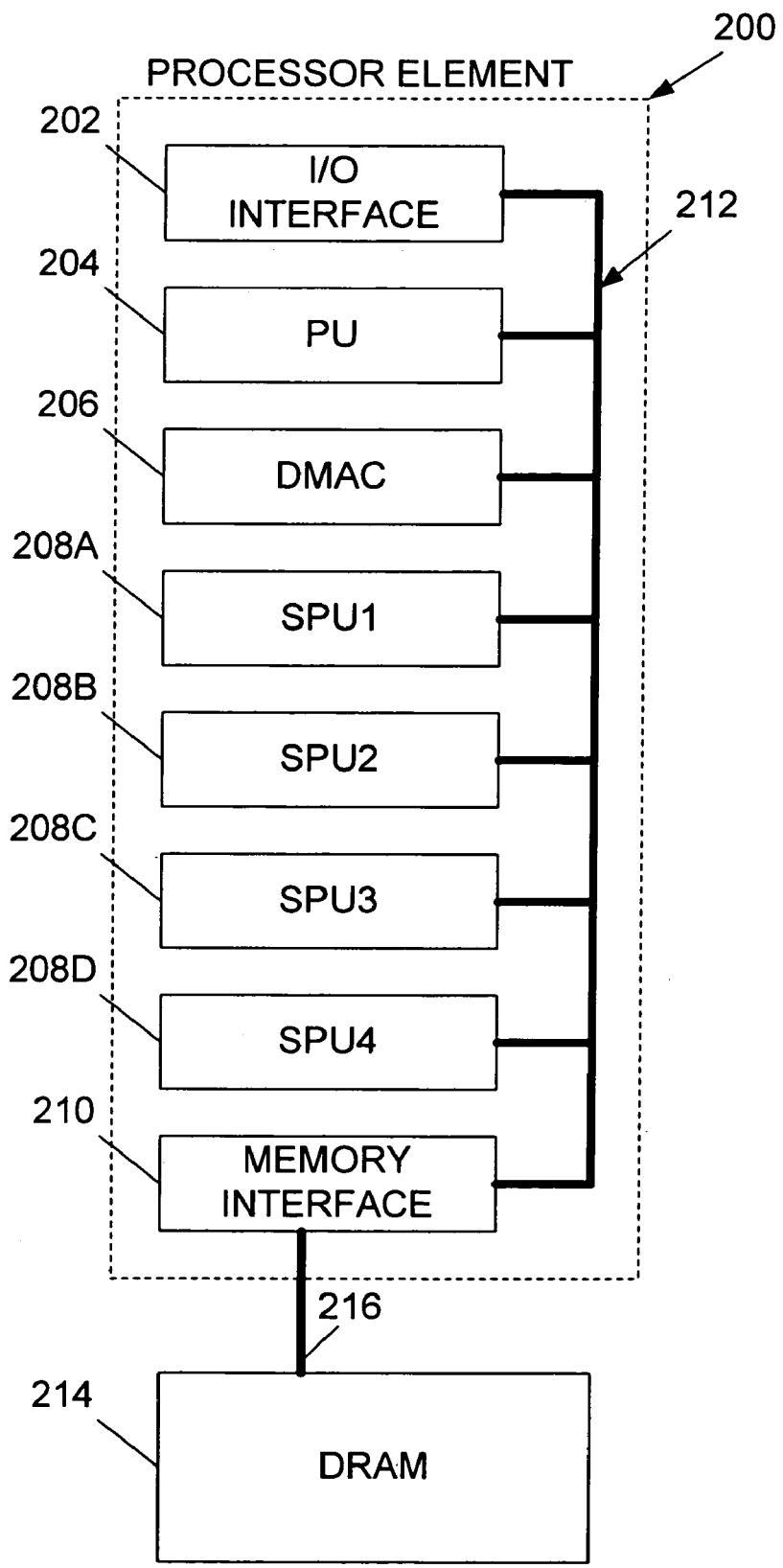
FIG. 14 is a block diagram illustrating an alternative processing system, called a processor element (PE) that may be utilized in alternative embodiments of the present invention to execute the process steps of one or more of FIGS. 2–13.

While single microprocessor systems, such as that illustrated in FIG. 1, may enjoy the advantages of the present invention, it has been discovered that further advantageous processing capabilities may be achieved utilizing a multiprocessing system in accordance with the present invention. In this regard, reference is made to FIG. 14, which is block diagram of a basic processing module or processor element (PE) 200. As shown in this figure, PE 200 comprises an I/O interface 202, a processing unit (PU) 204, a direct memory access controller (DMAC) 206, and a plurality of SPUs 208, namely, SPU 208A–D. A local (or internal) PE bus 212 transmits data and applications among PU 204, the SPUs 208, DMAC 206, and a memory interface 210. Local PE bus 212 can have, e.g., a conventional architecture or can be implemented as a packet switch network. Implementation as a packet switch network, while requiring more hardware, increases available bandwidth.

PE 200 can be constructed using various methods for implementing digital logic. PE 200 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. PE 200 also could be implemented using superconducting material, e.g., rapid single-flux-quantum (RSFQ) logic.

PE 200 is closely associated with a dynamic random access memory (DRAM) 214 through a high bandwidth memory connection 216. DRAM 214 functions as the main memory for PE 200. Although a DRAM 214 preferably is a dynamic random access memory, DRAM 214 could be implemented using other means, e.g., as a static random access memory (SRAM), a magnetic random access memory (MRAM), an optical memory or a holographic memory. DMAC 206 and memory interface 210 facilitate the transfer of data between DRAM 214, the SPUs 208, and PU 204 of PE 200. It is noted that the DMAC 206 and/or the memory interface 210 may be integrally disposed in one or more of the PU 204 and SPUs 208.

PU 204 can be, e.g., a standard processor capable of stand-alone processing of data and applications. In operation, PU 204 schedules and orchestrates the processing of data and applications by the SPUs 208. The SPUs 208 preferably are single instruction, multiple data (SIMD) processors. Under the control of PU 204, the SPUs 208 perform the processing of these data and applications in a parallel and independent manner. DMAC 206 controls accesses by PU 204 and the SPUs 208 to the data and applications stored in the shared DRAM 214. It is noted that the PU 204 may be implemented by one of the sub-processing units 208 taking on the role of a main processing unit that schedules and orchestrates the processing of data and applications by the sub-processing units 208.

A number of PEs, such as PE 200, may be joined or packaged together to provide enhanced processing power.

Figure 15:
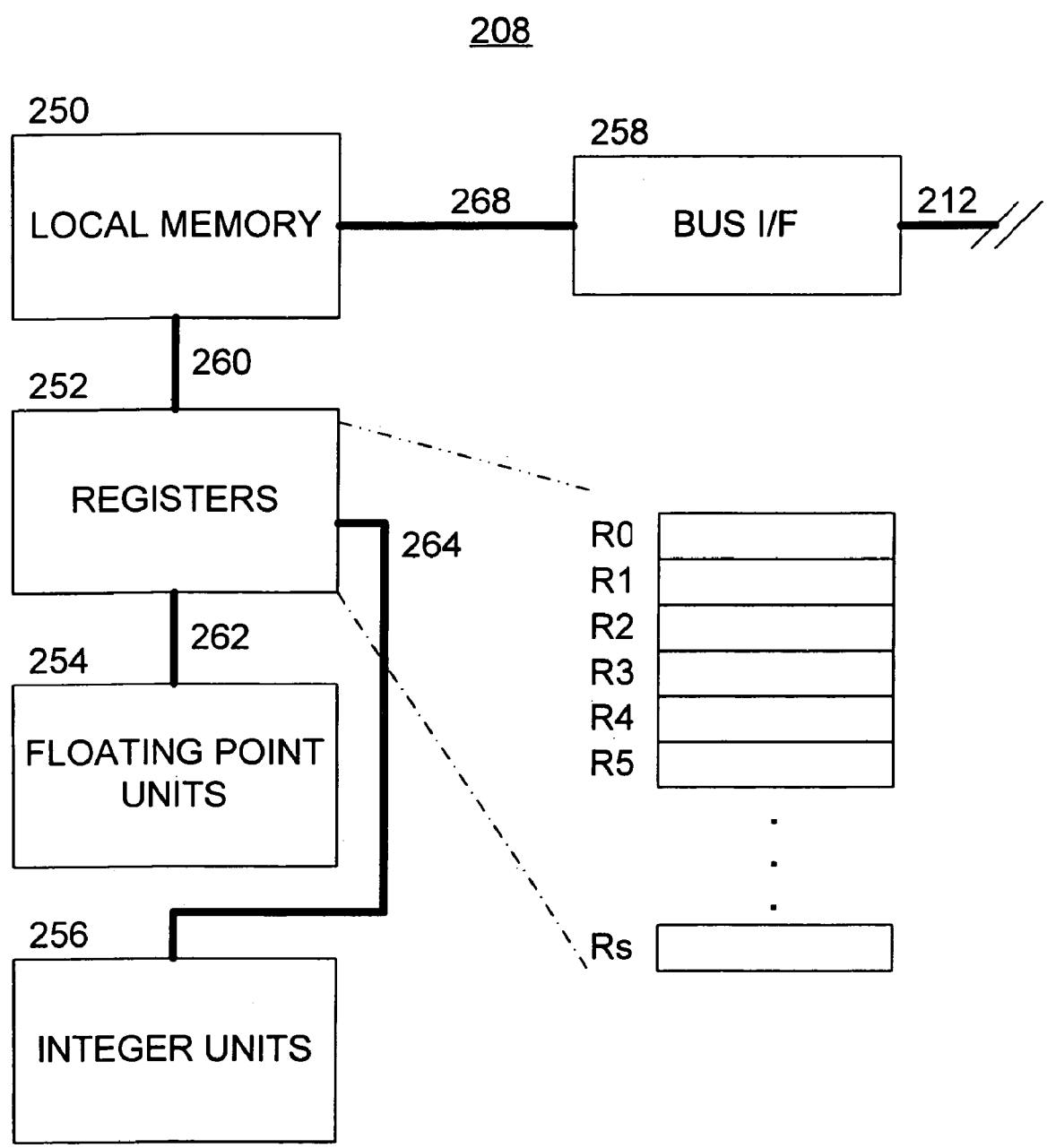
FIG. 15 is a block diagram illustrating the preferred structure of an exemplary sub-processing unit (SPU) in accordance with one or more further aspects of the present invention.

FIG. 15 illustrates the structure and function of an SPU 208. SPU 208 includes local memory 250, registers 252, one or more floating point units 254 and one or more integer units 256. Again, however, depending upon the processing power required, a greater or lesser number of floating points units 254 and integer units 256 may be employed. In a preferred embodiment, local memory 250 contains 256 kilobytes of storage, and the capacity of registers 252 is 128×128 bits. Floating point units 254 preferably operate at a speed of 32 billion floating point operations per second (32 GFLOPS), and integer units 256 preferably operate at a speed of 32 billion operations per second (32 GOPS).

Local memory 250 may or may not be a cache memory as cache coherency support for an SPU 208 is unnecessary. Local memory 250 is preferably constructed as a static random access memory (SRAM). A PU 204 may require cache coherency support for direct memory accesses initiated by the PU 204. Cache coherency support is not required, however, for direct memory accesses initiated by the SPU 208 or for accesses from and to external devices.

SPU 208 further includes bus 212 for transmitting applications and data to and from the SPU 208. In a preferred embodiment, bus 212 is 256 bits wide. SPU 208 further includes internal busses 260, 262 and 264. In a preferred embodiment, bus 260 has a width of 256 bits and provides communications between local memory 250 and registers 252. Busses 262 and 264 provide communications between, respectively, registers 252 and floating point units 254, and between registers 252 and integer units 256. In a preferred embodiment, the width of busses 262 and 264 from registers 252 to the floating point or integer units is 384 bits, and the width of busses 262 and 264 from the floating point or integer units 254, 256 to registers 252 is 128 bits. The larger width of these busses from registers 252 to the floating point or integer units 254, 256 than from these units to registers 252 accommodates the larger data flow from registers 252 during processing. A maximum of three words are needed for each calculation. The result of each calculation, however, normally is only one word.

It is noted that the capabilities of the present invention may be imbued upon a processing system at least in part by way of a software program containing one or more computer instructions, such as the mov *Rm, Rp instruction, the mov Rp, *Rm instruction, the store *Rm, address1, the load address1, *Rm instruction, etc. Thus, the advantages of the present invention may be enjoyed by systems that load such software programs from storage media, such as magnetic discs, optical discs, electronic storage media, or any other storage media presently known or hereinafter developed.

Advantageously, the present invention provides methods and apparatus for utilizing a plurality of registers in an indexed fashion such that data manipulation may be achieved using the registers as a local memory and such that data storage or loading from random access memory may be avoided. This at least partially addresses the needs in the art for methods and apparatus that are capable of improving intra-register data processing such as moving data from one register to another, copying data from one register to another, etc. so that memory accesses may be significantly reduced and the associated latency may be avoided.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   performing computations to obtain a calculated value;
   loading the calculated value into at least one of a plurality of hardware registers of a processing system, each hardware register having an identifier number associated therewith;
   using the calculated value as an index to one of the identifier numbers and the hardware register associated therewith; and
   accessing data from the hardware register indexed by the calculated value.

2. The method of claim 1, further comprising: copying the data into another one of the hardware registers.

3. The method of claim 2, wherein the step of copying the data into another one of the hardware registers occurs without requiring access into a random access memory of the processing system.

4. The method of claim 1, wherein the computations are performed while the processing system is executing a software program.

5. The method of claim 1, wherein the steps are used in a table look up procedure that does not require access into a random access memory of the processing system.

6. The method of claim 1, further comprising: accessing the calculated value from the at least one hardware register and using the calculated value as a pointer to the indexed hardware register.

7. The method of claim 2, wherein the steps are executed in response to a computer instruction defining a data move from a source hardware register to a destination hardware register.

8. The method of claim 7, wherein the source hardware register is the hardware register indexed by the calculated value, and the destination hardware register is the other hardware register.

9. The method of claim 8, wherein the computer instruction may be characterized by the following operational code:

mov*Rm, Rp wherein Rm is a hardware register in which the calculated value is located, and Rp is the destination register.

10. The method of claim 1, wherein processing system includes a reduced instruction set computer (RISC) microprocessor.

11. A storage medium containing at least one software instruction operable to cause a processor and a plurality of hardware registers, each hardware register having an identifier number associated therewith, to perform steps, comprising:
   performing computations to obtain a calculated value;
   loading the calculated value into at least one of a the plurality of hardware registers;

using the calculated value as an index to one of the identifier numbers and the hardware register associated therewith; and accessing data from the hardware register indexed by the calculated value.

12. The storage medium of claim 11, wherein the steps further comprise: copying the data into another one of the hardware registers.

13. The storage medium of claim 11, wherein the step of copying the data into another one of the hardware registers occurs without requiring access into a random access memory coupled to the processor.

14. The storage medium of claim 11, wherein the computations are performed during the execution of a software program containing the at least one software instruction.

15. The storage medium of claim 11, wherein the steps are used in a table look up procedure that does not require access into a random access memory coupled to the processor.

16. The storage medium of claim 11, further comprising: accessing the calculated value from the at least one hardware register and using the calculated value as a pointer to the indexed hardware register.

17. The storage medium of claim 13, wherein the at least one software instruction defines a data move from a source hardware register to a destination hardware register.

18. The storage medium of claim 17, wherein the source hardware register is the hardware register indexed by the calculated value, and the destination hardware register is the other hardware register.

19. The storage medium of claim 18, wherein the at least one software instruction may be characterized by the following operational code:

mov*Rm, Rp wherein Rm is a hardware register in which the calculated value is located, and Rp is the destination register.

20. The storage medium of claim 11, wherein processor includes a reduced instruction set computer (RISC) microprocessor.

21. A processing system including a storage medium containing at least one software instruction operable to cause a processor and a plurality of hardware registers of the processing system, each hardware register having an identifier number associated therewith, to perform steps, comprising:

performing computations to obtain a calculated value;
loading the calculated value into at least one of a the plurality of hardware registers;
using the calculated value as an index to one of the identifier numbers and the hardware register associated therewith; and
accessing data from the hardware register indexed by the calculated value.

22. The processing system of claim 21, wherein the steps further comprise: copying the data into another one of the hardware registers.

23. The processing system of claim 21, wherein the step of copying the data into another one of the hardware registers occurs without requiring access into a random access memory coupled to the processor.

24. The processing system of claim 21, wherein the computations are performed during execution of a software program containing the at least one software instruction.

25. The processing system of claim 21, wherein the steps are used in a table look up procedure that does not require access into a random access memory coupled to the processor.

26. The processing system of claim 21, further comprising: accessing the calculated value from the at least one hardware register and using the calculated value as a pointer to the indexed hardware register.

27. The processing system of claim 22, wherein the at least one software instruction defines a data move from a source hardware register to a destination hardware register.

28. The processing system of claim 27, wherein the source hardware register is the hardware register indexed by the calculated value, and the destination hardware register is the other hardware register.

29. The processing system of claim 28, wherein the at least one software instruction may be characterized by the following operational code:

mov*Rm, Rp wherein Rm is a hardware register in which the calculated value is located, and Rp is the destination register.

30. The processing system of claim 21, wherein processor includes a reduced instruction set computer (RISC) microprocessor.

31. A method, comprising:

performing computations to obtain a calculated value;
loading the calculated value into at least one of a plurality of hardware registers of a processing system, each hardware register having an identifier number associated therewith;
using the calculated value as an index to one of the identifier numbers and the hardware register associated therewith; and
accessing data from another one of the hardware registers.

32. The method of claim 31, further comprising: copying the data into the hardware register indexed by the calculated value.

33. The method of claim 31, wherein the step of copying the data into the hardware register indexed by the calculated value occurs without requiring access into a random access memory of the processing system.

34. The method of claim 31, wherein the computations are performed during execution of a software program running on the processing system.

35. The method of claim 31, wherein the steps are used in a table look up procedure that does not require access into a random access memory of the processing system.

36. The method of claim 31, further comprising: accessing the calculated value from the at least one hardware register and using the calculated value as a pointer to the indexed hardware register.

37. The method of claim 32, wherein the steps are executed in response to a computer instruction defining a data move from a source hardware register to a destination hardware register.

38. The method of claim 37, wherein the source hardware register is the other hardware register, and the destination hardware register is the hardware register indexed by the calculated value.

39. The method of claim 38, wherein the computer instruction may be characterized by the following operational code:

mov Rp,*Rm wherein Rm is a hardware register in which the calculated value is located, and Rp is the source register.

40. The method of claim 31, wherein processing system includes a reduced instruction set computer (RISC) microprocessor.

41. A storage medium containing at least one software instruction operable to cause a processor and a plurality of hardware registers, each hardware register having an identifier number associated therewith, to perform steps, comprising:

performing computations to obtain a calculated value;

loading the calculated value into at least one of the plurality of hardware registers;

using the calculated value as an index to one of the identifier numbers and the hardware register associated therewith; and accessing data from another one of the hardware registers.

42. The storage medium of claim 41, wherein the steps further comprise: copying the data into the hardware register indexed by the calculated value.

43. The storage medium of claim 41, wherein the step of copying the data into the hardware register indexed by the calculated value occurs without requiring access into a random access memory coupled to the processor.

44. The storage medium of claim 41, wherein the computations are performed during execution of a software program containing the at least one software instruction.

45. The storage medium of claim 41, wherein the steps are used in a table look up procedure that does not require access into a random access memory coupled to the processor.

46. The storage medium of claim 41, further comprising: accessing the calculated value from the at least one hardware register and using the calculated value as a pointer to the indexed hardware register.

47. The storage medium of claim 42, wherein the software instruction defines a data move from a source hardware register to a destination hardware register.

48. The storage medium of claim 47, wherein the source hardware register is the other hardware register, and the destination hardware register is the hardware register indexed by the calculated value.

49. The storage medium of claim 48, wherein the at least one software instruction may be characterized by the following operational code:

mov Rp,*Rm wherein Rm is a hardware register in which the calculated value is located, and Rp is the source register.

50. The storage medium of claim 41, wherein processor is a reduced instruction set computer (RISC) microprocessor.

51. A processing system including a storage medium containing at least one software instruction operable to cause a processor and a plurality of hardware registers of the processing system, each hardware register having an identifier number associated therewith, to perform steps, comprising:

performing computations to obtain a calculated value;

loading the calculated value into at least one of the plurality of hardware registers;

using the calculated value as an index to one of the identifier numbers and the hardware register associated therewith; and accessing data from another one of the hardware register.

52. The processing system of claim 51, wherein the steps further comprise: copying the data into the hardware register indexed by the calculated value.

53. The processing system of claim 51, wherein the step of copying the data into the hardware register indexed by the calculated value occurs without requiring access into a random access memory coupled to the processor.

54. The processing system of claim 51, wherein the computations are performed during execution of a software program containing the at least one software instruction.

55. The processing system of claim 51, wherein the steps are used in a table look up procedure that does not require access into a random access memory coupled to the processor.

56. The processing system of claim 51, further comprising: accessing the calculated value from the at least one hardware register and using the calculated value as a pointer to the indexed hardware register.

57. The processing system of claim 52, wherein the software instruction defines a data move from a source hardware register to a destination hardware register.

58. The processing system of claim 57, wherein the source hardware register is the other hardware register, and the destination hardware register is the hardware register indexed by the calculated value.

59. The processing system of claim 58, wherein the at least one software instruction may be characterized by the following operational code:

mov Rp,*Rm wherein Rm is a hardware register in which the calculated value is located, and Rp is the source register.

60. The processing system of claim 51, wherein processor is a reduced instruction set computer (RISC) microprocessor.

61. A method, comprising:

performing computations to obtain a calculated value;

loading the calculated value into at least one of a plurality of hardware registers of a processing system, each hardware register having an identifier number associated therewith;

using the calculated value as an index to one of the identifier numbers and the hardware register associated therewith; and at least one of (i) storing data into a random access memory (RAM) coupled to the processor by accessing data from the hardware register indexed by the calculated value and copying the data into the RAM at a specified address; and (ii) loading data from the RAM by accessing data from the RAM at a specified address and copying the data into the hardware register indexed by the calculated value.

62. A storage medium containing at least one software instruction operable to cause a processor and a plurality of hardware registers, each hardware register having an identifier number associated therewith, to perform steps, comprising:

performing computations to obtain a calculated value;

loading the calculated value into at least one of the hardware registers;

using the calculated value as an index to one of the identifier numbers and the hardware register associated therewith; and at least one of (i) storing data into a random access memory (RAM) coupled to the processor by accessing data from the hardware register indexed by the calculated value and copying the data into the RAM at a specified address; and (ii) loading data from the RAM by accessing data from the RAM at a specified address and copying the data into the hardware register indexed by the calculated value.

63. A processing system including a storage medium containing at least one software instruction operable to cause a processor and a plurality of hardware registers of the processing system, each hardware register having an identifier number associated therewith, to perform steps, comprising:
    performing computations to obtain a calculated value;
    loading the calculated value into at least one of the hardware registers;
    using the calculated value as an index to one of the identifier numbers and the hardware register associated therewith; and
    at least one of (i) storing data into a random access memory (RAM) coupled to the processor by accessing data from the hardware register indexed by the calculated value and copying the data into the RAM at a specified address; and (ii) loading data from the RAM by accessing data from the RAM at a specified address and copying the data into the hardware register indexed by the calculated value.

* * * * *

UNITED STATES PATENT AND TRADEMARK OFFICE
CERTIFICATE OF CORRECTION

| | |
|---|---|
| PATENT NO. | : 7,124,259 B2 |
| APPLICATION NO. | : 10/838051 |
| DATED | : October 17, 2006 |
| INVENTOR(S) | : Masahiro Yasue and Tatsuya Iwamoto |

It is certified that error appears in the above-identified patent and that said Letters Patent is hereby corrected as shown below:

Column 1, line 25, delete "a".
Column 1, line 51, "instructions" should read --instruction--.
Column 2, line 63, delete "a".
Column 3, line 9, delete "a".
Column 4, line 46, "illustration" should read --illustrating--.
Column 5, line 20, after "(PE)" insert --,--.
Column 5, line 65, "are" should read --s--.
Column 6, line 66, after "respect" insert --to--.
Column 9, line 13, after "where" insert --,--; after "examples" insert --,--.
Column 9, line 15, after "respect" insert --to--.
Column 9, line 16, after "which" insert --,--; after "before" insert --,--.
Column 9, line 21, delete "as".
Column 10, line 8, after "respect" insert --to--.
Column 10, line 12, "P2" should read --R2--.
Column 11, line 16, "points" should read --point--.
Column 12, line 66, delete "a".
Column 13, line 33, "mov*Rm, Rp" should read --mov *Rm, Rp--.
Column 14, line 15, "mov*Rm, Rp" should read --mov *Rm, Rp--.

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

PATENT NO. : 7,124,259 B2
APPLICATION NO. : 10/838051
DATED : October 17, 2006
INVENTOR(S) : Masahiro Yasue and Tatsuya Iwamoto It is certified that error appears in the above-identified patent and that said Letters Patent is hereby corrected as shown below:

Column 1, line 25, delete "a".
Column 1, line 51, "instructions" should read --instruction--.
Column 2, line 63, delete "a".
Column 3, line 9, delete "a".
Column 4, line 46, "illustration" should read --illustrating--.
Column 5, line 20, after "(PE)" insert --,--.
Column 5, line 65, "are" should read --is--.
Column 6, line 66, after "respect" insert --to--.
Column 9, line 13, after "where" insert --,--; after "examples" insert --,--.
Column 9, line 15, after "respect" insert --to--.
Column 9, line 16, after "which" insert --,--; after "before" insert --,--.
Column 9, line 21, delete "as".
Column 10, line 8, after "respect" insert --to--.
Column 10, line 12, "P2" should read --R2--.
Column 11, line 16, "points" should read --point--.
Column 12, line 66, delete "a".
Column 13, line 33, "mov*Rm, Rp" should read --mov *Rm, Rp--.
Column 14, line 15, "mov*Rm, Rp" should read --mov *Rm, Rp--.

This certificate supersedes Certificate of Correction issued July 3, 2007.

Signed and Sealed this

Sixth Day of November, 2007

JON W. DUDAS
*Director of the United States Patent and Trademark Office*